(12) United States Patent
Klein et al.

(10) Patent No.: US 7,582,267 B1
(45) Date of Patent: Sep. 1, 2009

(54) SPACE SAVING SERVICEABLE EXHAUST AFTERTREATMENT ASSEMBLY

(75) Inventors: Patrick M. Klein, Madison, WI (US); Jeffrey T. Sedlacek, Stoughton, WI (US); David M. Grimm, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 762 days.

(21) Appl. No.: 11/243,694

(22) Filed: Oct. 5, 2005

(51) Int. Cl.
*B01D 50/00* (2006.01)
*B21D 51/16* (2006.01)
(52) U.S. Cl. .................................. 422/180; 29/890
(58) Field of Classification Search ............... 422/168, 422/180, 211, 212; 29/890
See application file for complete search history.

(56) References Cited

U.S. PATENT DOCUMENTS

| | | |
|---|---|---|
| 2,273,210 A | 2/1942 | Lowther et al. |
| 2,446,631 A | 8/1948 | Burks |
| 2,482,577 A | 9/1949 | Dahlstrom |
| 2,721,619 A | 1/1955 | Cheairs |
| 2,732,092 A | 1/1956 | Lawrence |
| 2,732,913 A | 1/1956 | Higgins |
| 2,921,432 A | 1/1960 | Marcotte et al. |
| 3,078,650 A | 2/1963 | Anderson et al. |
| 3,423,909 A | 1/1969 | Bennett et al. |
| 3,616,618 A | 11/1971 | Gronholz et al. |
| 3,817,221 A | 6/1974 | Nohira et al. |
| 3,834,134 A | 9/1974 | McAllister |
| 4,020,783 A | 5/1977 | Anderson et al. |
| 4,278,455 A | 7/1981 | Nardi |
| 4,312,651 A | 1/1982 | Easki et al. |
| 4,378,983 A | 4/1983 | Martin |
| 4,450,934 A | 5/1984 | Davis |
| 4,488,889 A | 12/1984 | McCarroll |
| 4,527,659 A | 7/1985 | Harrington |
| 4,629,226 A | 12/1986 | Cassel et al. |
| 5,170,020 A | 12/1992 | Kruger et al. |
| 5,321,215 A | 6/1994 | Kicinski |
| 5,808,245 A | 9/1998 | Wiese et al. |
| 6,152,258 A | 11/2000 | Deavers et al. |
| 6,412,595 B1 | 7/2002 | Horak et al. |
| 6,430,921 B1 | 8/2002 | Stuart et al. |
| 6,632,406 B1 * | 10/2003 | Michelin et al. ............ 422/178 |
| 6,824,743 B1 | 11/2004 | Pawson et al. |
| 6,868,670 B1 | 3/2005 | Schellin |

FOREIGN PATENT DOCUMENTS

| | | |
|---|---|---|
| GB | 882647 | 11/1961 |
| GB | 02 919 378 | 6/1979 |
| JP | 35822323 A | 11/1983 |
| JP | 358202323 A | 11/1983 |
| JP | 411072018 | 3/1999 |

* cited by examiner

*Primary Examiner*—Tom Duong
(74) *Attorney, Agent, or Firm*—Andrus, Sceales, Starke & Sawall, LLP; J. Bruce Schelkopf

(57) ABSTRACT

An aftertreatment exhaust assembly includes housing sections separable from each other at a service joint axially between axial ends of an aftertreatment element for ease of servicing. The aftertreatment element has an axial end within a housing section saving axial extension space.

15 Claims, 4 Drawing Sheets

SPACE SAVING SERVICEABLE EXHAUST AFTERTREATMENT ASSEMBLY

BACKGROUND AND SUMMARY

The invention relates to exhaust aftertreatment assemblies having a particulate soot filter and/or a catalyst element.

Exhaust aftertreatment assemblies are known in the prior art. The assembly includes a particulate soot filter, e.g. a diesel particulate soot filter (DPF), and/or a catalyst element, e.g. a catalytic converter or other catalyst element reacting with exhaust gas for catalytic reduction. The present invention arose during continuing development efforts including directed toward space spacing and serviceability.

DETAILED DESCRIPTION

Figure 1:
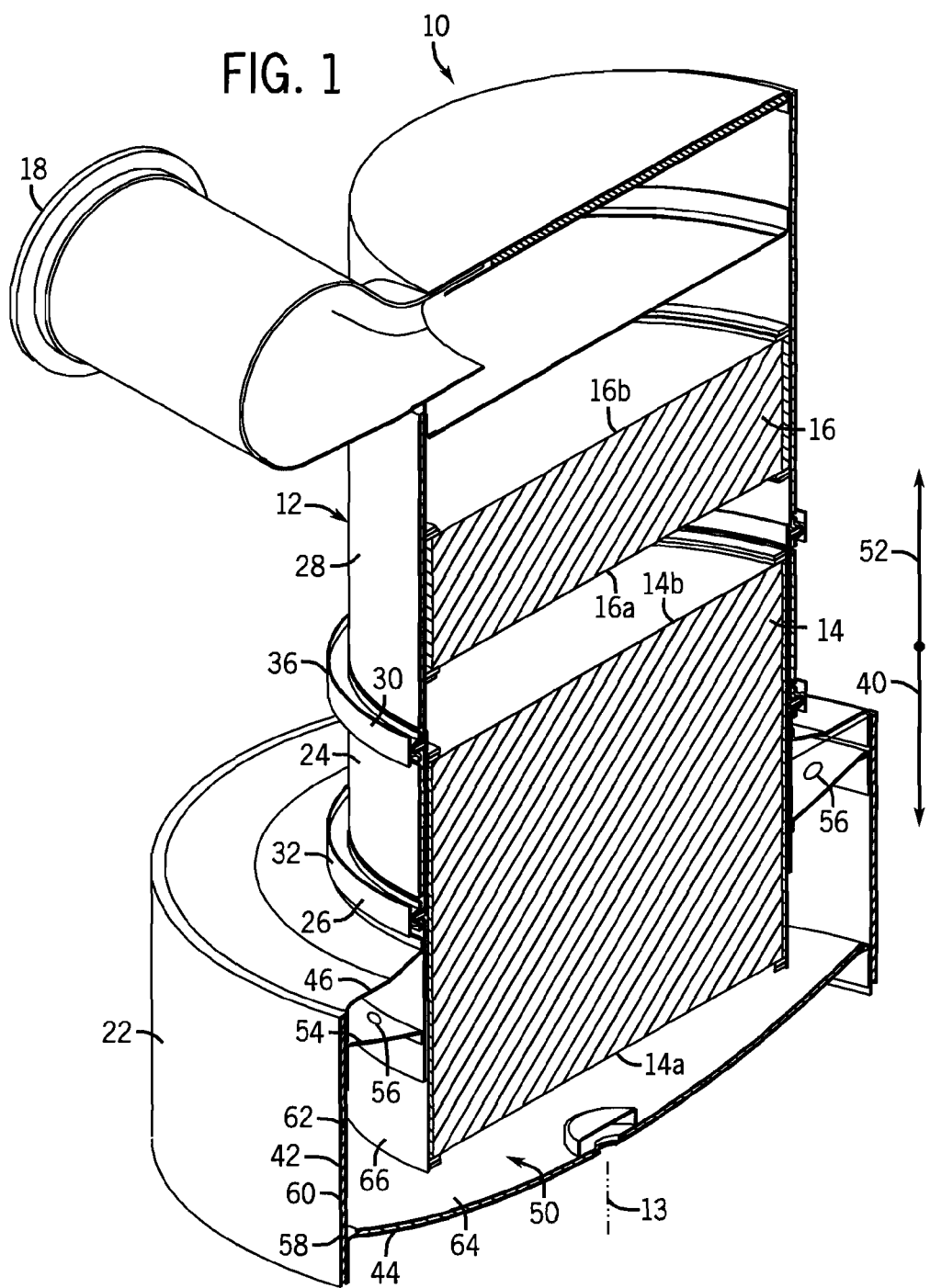
FIG. 1 is a cutaway perspective view of an aftertreatment exhaust assembly in accordance with the invention.
Figure 2:
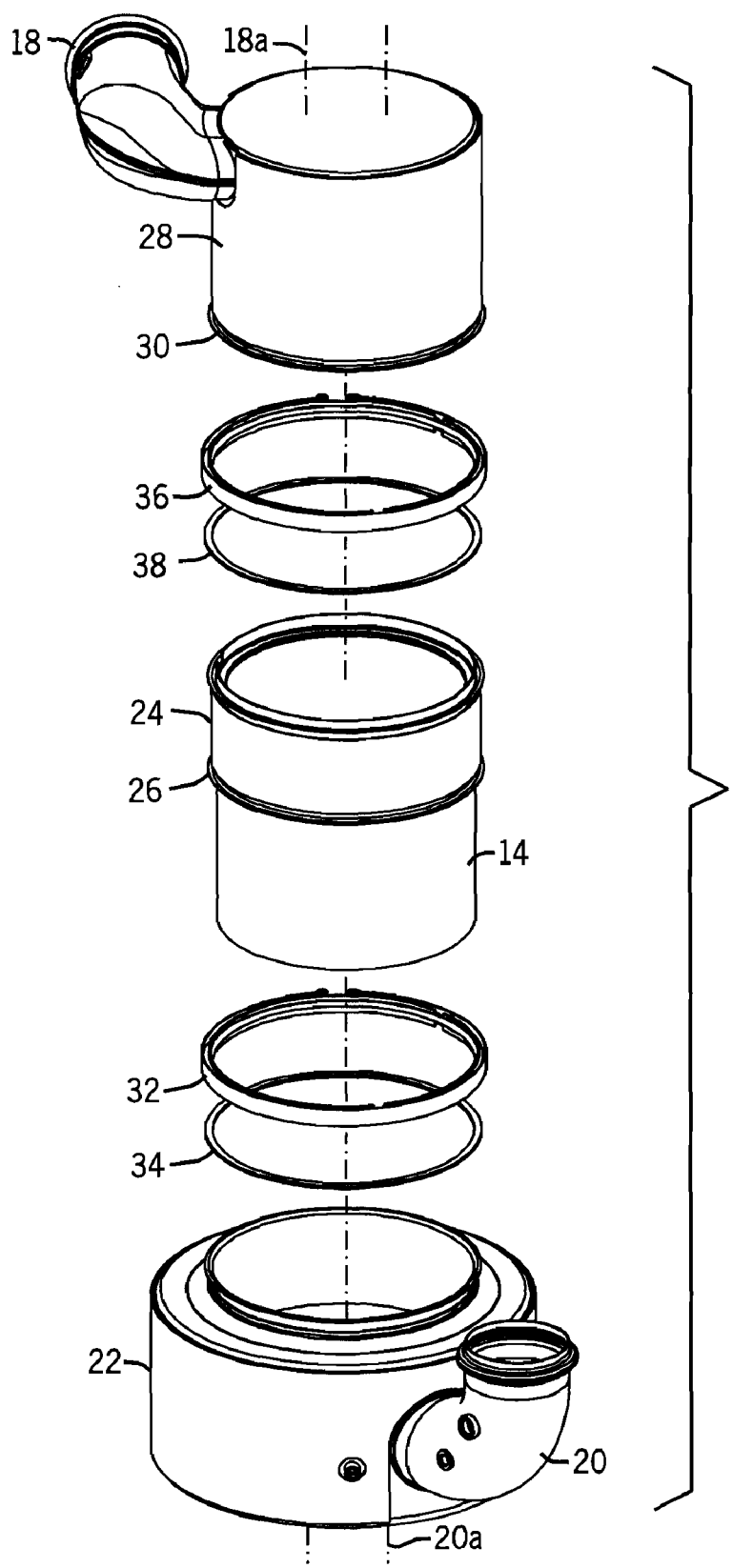
FIG. 2 is an exploded perspective view of the assembly of FIG. 1.

FIGS. 1, 2 show an aftertreatment exhaust assembly 10 having a housing 12 extending axially along axis 13 and containing an aftertreatment element, for example one or both of a particulate soot filter 14 and a catalyst element 16. The housing has an inlet 18 and an outlet 20 communicating respectively with distally opposite axial ends 14a and 14b of aftertreatment element 14, and 16a and 16b of aftertreatment element 16. Exhaust flows from inlet 18 then axially through aftertreatments element 16, 14 then to outlet 20. The housing has housing sections 22 and 24 meeting at a junction at joint 26 axially between axial ends 14a and 14b of aftertreatment element 14. The housing has housing sections 24 and 28 meeting at junction 30 axially between aftertreatment elements 14 and 16. Alternatively, joint 30 may be axially between axial ends 16a and 16b of aftertreatment element 16.

Joint 26 is a service joint. Housing sections 22 and 24 are separable from each other at service joint 26 such that upon separation of housing sections 22 and 24, axial end 14a of aftertreatment element 14 is axially spaced beyond housing section 24, and the aftertreatment element is readily accessible, for ease of servicing, e.g. cleaning. During such servicing, aftertreatment element 14 will typically, though not necessarily, remain attached to housing section 24, e.g. by welding. Connection 32 connects housing sections 22 and 24 to each other at service joint 26. In one form, the connection 32 is a band clamp known in the prior art, e.g. an inverted truncated V-shape band clamp, though other types of connections may be used, for example a bolted flange connection, or other typical arrangements for connecting housing or body sections. In some embodiments, a gasket 34 is provided between housing sections 22 and 24 at joint 26. A connection 36 connects housing sections 24 and 28 to each other at joint 30, which connection may be a band clamp, e.g. the noted standard inverted truncated V-shape type clamp, or other connections, as noted. In some embodiments a gasket 38 is provided between housing sections 24 and 28 at joint 30. Inlet 18 may extend radially from the housing as shown, or alternatively the inlet may extend axially from the housing as shown in dashed line at 18a. Outlet 20 may extend radially from the housing as shown, or alternatively may extend axially from the housing as shown in dashed line at 20a.

In FIGS. 1, 2, housing section 22 is an outlet housing section. Aftertreatment element 14 extends axially into outlet housing section 22 along a first axial direction 40, and has an outlet axial end 14a within outlet housing section 22. Outlet housing section 22 has a sidewall 42 extending axially between first and second end walls 44 and 46 and of larger diameter than aftertreatment element 14 and providing an outlet plenum 50 of reduced restriction. End wall 44 of outlet housing section 22 is axially spaced from outlet axial end 14a of aftertreatment element 14 along the noted first axial direction 40. End wall 46 of outlet housing section 22 is axially spaced from outlet axial end 14a of aftertreatment element 14 along a second axial direction 52, which second axial direction 52 is opposite to the noted first axial direction 40. An inner end wall 54 may be provided in outlet housing section 22, which end wall 54 may be perforated or otherwise have apertures such as 56 therethrough for forming a resonant chamber between end walls 54 and 46 for resonant tuning purposes. In further embodiments, an enlarged reduced restriction inlet plenum is provided in addition to or instead of outlet plenum 50.

Sidewall 42 of outlet housing section 22 has a first span 58 extending from end wall 44 axially along the noted second axial direction 52 to a midpoint 60 radially aligned with outlet axial end 14a of aftertreatment element 14. Sidewall 42 has a second span 62 extending from midpoint 60 axially along the noted second axial direction 52 to end wall 46. Span 60 and end wall 44 define an open volume first plenum section 64 at outlet axial end 14a of aftertreatment element 14 and extending axially along the noted first axial direction 40 therefrom. Span 62 and end wall 46 define an annular volume second plenum section 66 at outlet axial end 14a of aftertreatment element 14 and extending axially along the noted second axial direction 52 therefrom and in circumscribing relation to aftertreatment element 14. In one embodiment, the axial length of second span 62 is greater than the axial length of first span 60 to reduce and save space at outlet axial end 14a of aftertreatment element 14 along the noted first axial direction 40 therefrom and reduce the amount of axial extension of housing 12 in the noted first axial direction 40 beyond outlet axial end 14a of aftertreatment element 14. Further in the preferred embodiment, sidewall 42 of outlet housing section 22 is of larger diameter than housing section 24.

Outlet 20 is provided by an outlet tube extending radially from outlet housing section 22 at any desired circumferential position therearound, which is an advantage for accommodating different engine compartment requirements. In one embodiment, outlet tube 20 is radially aligned with outlet axial end 14a of aftertreatment element 14. Joint 30 is axially spaced from joint 26 by housing section 24 therebetween. Inlet 18 communicates with housing section 28, and outlet 20 communicates with housing section 22. Joint 30 is axially between joint 26 and inlet 18. Joint 30 is axially spaced from joint 26 on the opposite axial side thereof from end 14a of aftertreatment element 14. Joint 30 is slightly axially spaced from aftertreatment element 14. Housing section 24 axially spans axial end 14b of aftertreatment element 14. Axial end 14b of aftertreatment element 14 is axially between joints 26 and 30.

Figure 3:
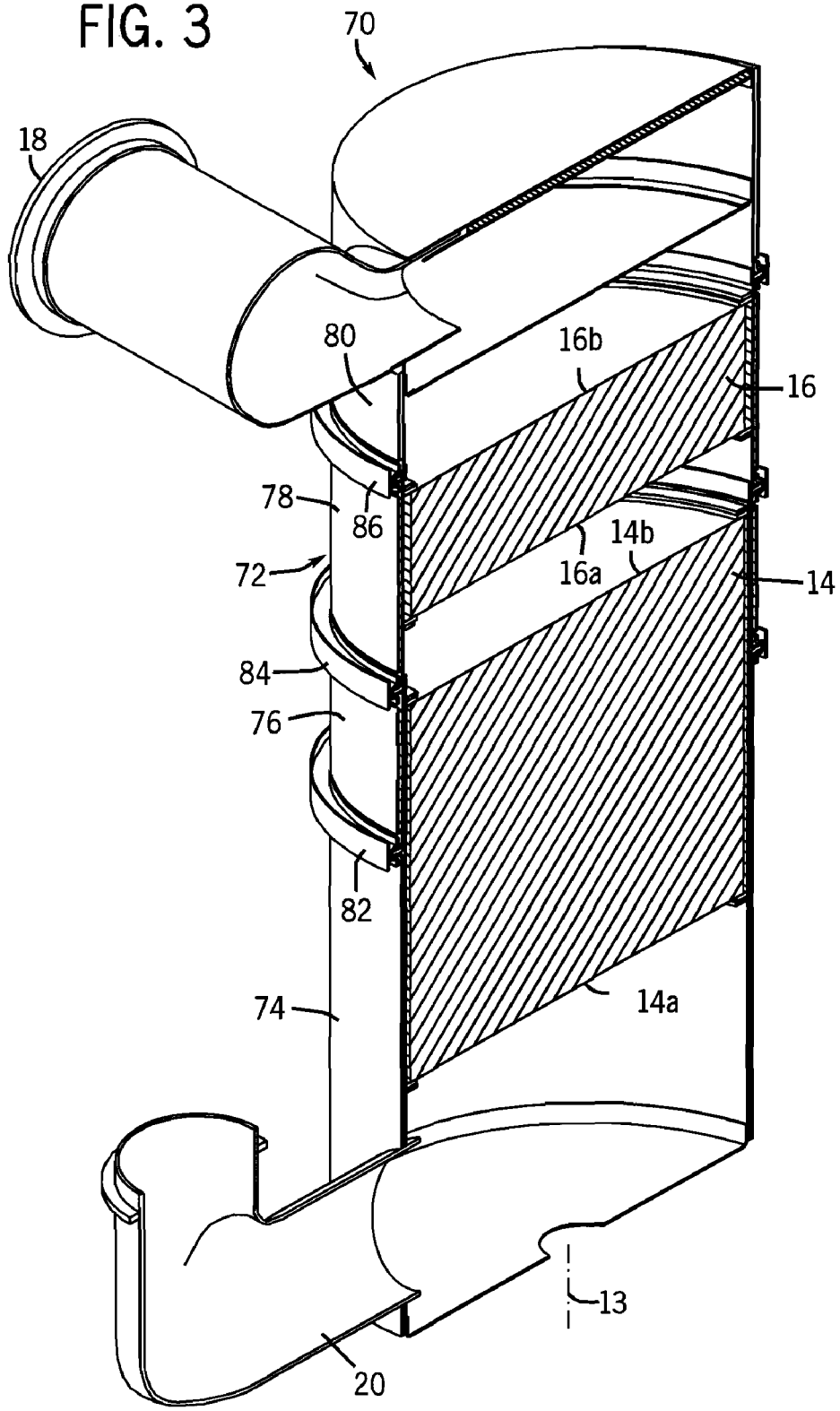
FIG. 3 is like FIG. 1 and shows another embodiment.
Figure 4:
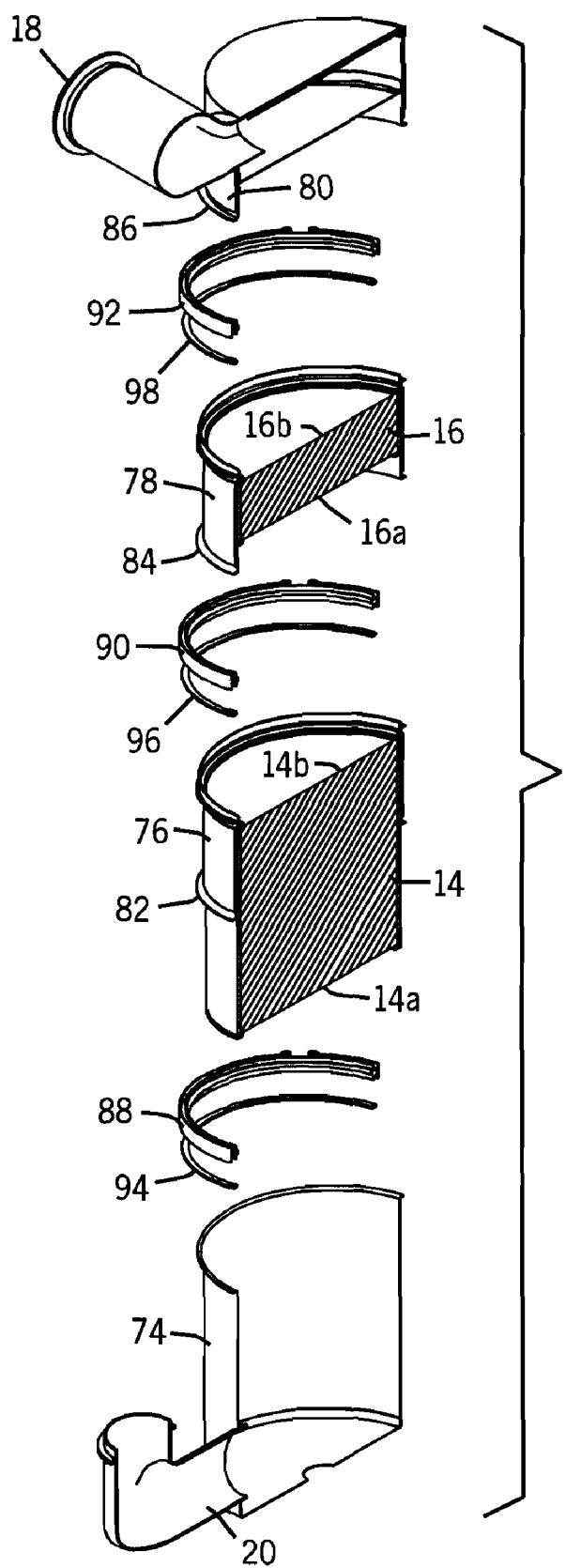
FIG. 4 is a cutaway exploded perspective view of the assembly of FIG. 3.

FIGS. 3, 4 show another embodiment and use like reference numerals from above where appropriate to facilitate understanding. Aftertreatment exhaust assembly 70 includes a housing 72 extending axially along axis 13 and containing at least one aftertreatment element, and in some embodiments two aftertreatment elements, namely a particulate soot filter 14 and a catalyst element 16. The housing has an inlet 18 and an outlet 20 communicating respectively with axially distally opposite axial ends of the aftertreatment elements. Exhaust flows from inlet 18 then axially through the aftertreatment elements then to outlet 20. The housing has first, second, third and fourth sections 74, 76, 78, 80. First and second housing sections 74 and 76 meet at a first joint 82. Second and third housing sections 76 and 78 meet at second joint 84. Third and fourth housing sections 78 and 80 meet at a third joint 86. Joint 82 is axially between axial ends 14a and 14b of aftertreatment element 14. Respective housing sections 74 and 76 on opposite axial sides of joint 82 are separable from each other at joint 82 such that upon separation of respective housing sections 74 and 76 the noted axial end 14a of aftertreatment element 14 extends axially beyond housing section 76, and the aftertreatment element is readily accessible for ease of servicing.

In FIGS. 3, 4, joint 84 is axially spaced from joint 82 on the opposite axial side thereof from axial end 14a of aftertreatment element 14. Joint 84 is slightly axially spaced from aftertreatment element 14. Alternatively, joint 84 may be axially between axial ends 16a and 16b of aftertreatment element 16. Housing section 76 axially spans axial end 14b of aftertreatment element 14. Inlet 18 is at housing section 80, and outlet 20 is at housing section 74, though this arrangement may be reversed. The joints may be clamped by respective connections, e.g. band clamps 88, 90, 92, as above, and may have respective gaskets 94, 96, 98 between respective housing sections, as above.

The systems provide a method for servicing an aftertreatment exhaust assembly comprising providing a joint as a service joint, as noted, at a location axially between the axial ends 14a and 14b of the aftertreatment element 14, and separating the housing sections 22 and 24, 74 and 76, from each other at the service joint 26, 82, such that upon separation of the noted housing sections, axial end 14a of the aftertreatment element 14 is axially spaced beyond the housing section 24, 76, and servicing the aftertreatment element 14. The system also provides a method for saving space in an aftertreatment exhaust assembly comprising providing an outlet housing section 22 wherein the aftertreatment element 14 extends axially into such outlet housing section 22, with the outlet axial end 14a of the aftertreatment element 14 being within outlet housing section 22, and providing the outlet housing section 22 with a sidewall 42 extending axially between first and second end walls 44 and 46 and of larger diameter than the aftertreatment element 14 and providing an outlet plenum 50 of reduced restriction and reduced axial extension along the noted first axial direction from the outlet axial end 14a of the aftertreatment element 14. The method further involves providing the joint 26 at a location axially between the axial ends 14a and 14b of the aftertreatment element 14. The method further involves spacing the first end wall 44 of the outlet housing section 22 axially from the outlet axial end 14a of the aftertreatment element 14 along the noted first axial direction 40, spacing the second end wall 46 and/or 54 of the outlet housing section 22 axially from the outlet axial end 14a of the aftertreatment element 14 along the noted second axial direction 52, providing the sidewall 42 of the outlet housing section 22 with a first span 58 extending from first end wall 44 axially along the noted second axial direction 52 to a midpoint 60 radially aligned with the outlet axial end 14a of the aftertreatment element 14, providing the sidewall 42 of the outlet housing section 22 with a second span 62 extending from the midpoint 60 axially along the noted second axial direction 52 to the noted second end wall 46, providing the first span 58 and the first end wall 44 defining an open volume first plenum section 64 at the outlet axial end 14a of the aftertreatment element 14 and extending axially along the noted first axial direction 40 therefrom, providing the second span 62 and the second end wall 46 defining an annular volume second plenum section 66 at the outlet axial end 14a of the aftertreatment element 14 and extending axially along the noted second axial direction 52 therefrom and in circumscribing relation to the aftertreatment element 14. The method further involves providing the second span 62 of greater axial length than the first span 58 to reduce and save space at the outlet axial end 14a of the aftertreatment element 14 along the noted first axial direction 40 therefrom and reduce the amount of axial extension of the housing 12 in the noted first axial direction 40 beyond the outlet axial end 14a of the aftertreatment element 14.

It is recognized that various equivalents, alternatives and modifications are possible within the scope of the appended claims.

What is claimed is:

1. An aftertreatment exhaust assembly comprising an axially extending housing containing an aftertreatment element, said aftertreatment element being selected from the group consisting of at least one of a particulate soot filter and a catalyst element, said housing having an inlet and an outlet communicating respectively with axially distally opposite axial ends of said aftertreatment element, wherein exhaust flows from said inlet then axially through said aftertreatment element then to said outlet, said housing comprising at least first and second sections meeting at a joint axially between said axial ends of said aftertreatment element; wherein said first housing section is an outlet housing section; said aftertreatment element extends axially into said outlet housing section along a first axial direction, and said aftertreatment element has an outlet axial end within said outlet housing section; said outlet housing section has a sidewall extending axially between first and second end walls and of larger diameter than said aftertreatment element and providing an outlet plenum of reduced restriction; wherein said first end wall of said outlet housing section is axially spaced from said outlet axial end of said aftertreatment element along said first axial direction; said second end wall of said outlet housing section is axially spaced from said outlet axial end of said aftertreatment element along a second axial direction, said second axial direction being opposite to said first axial direction; said sidewall of said outlet housing section has a first span extending from said first end wall axially along said second axial direction to a midpoint radially aligned with said outlet axial end of said aftertreatment element, and has a second span extending from said midpoint axially along said second axial direction to said second end wall, said first span and said first end wall defining an open volume first plenum section at said outlet axial end of said aftertreatment element and extending axially along said first axial direction therefrom, said second span and said second end wall defining an annular volume second plenum section at said outlet axial end of said aftertreatment element and extending axially along said second axial direction therefrom and in circumscribing relation to said aftertreatment element.

2. An aftertreatment exhaust assembly according to claim 1 wherein said joint is a service joint, said first and second housing sections being separable from each other at said service joint such that upon separation of said first and second housing sections one of said axial ends of said aftertreatment element is axially spaced beyond one of said separated housing sections, such that said aftertreatment element is readily accessible for ease of servicing.

3. The aftertreatment exhaust assembly according to claim 2 comprising a connection connecting said first and second housing sections to each other at said service joint.

4. The aftertreatment exhaust assembly according to claim 1 wherein:
said inlet is selected from the group consisting of a radial inlet and an axial inlet;
said outlet is selected from the group consisting of a radial outlet and an axial outlet.

5. The aftertreatment exhaust assembly according to claim 1 wherein the axial length of said second span is greater than the axial length of said first span to reduce and save space at said outlet axial end of said aftertreatment element along said first axial direction therefrom and reduce the amount of axial extension of said housing in said first axial direction beyond said outlet axial end of said aftertreatment element.

6. The aftertreatment exhaust assembly according to claim 1 wherein said sidewall is of larger diameter than said second housing section.

7. The aftertreatment exhaust assembly according to claim 1 wherein said outlet extends radially from said outlet housing section and is radially aligned with said outlet axial end of said aftertreatment element.

8. The aftertreatment exhaust assembly according to claim 1 wherein said housing has inlet and outlet sections, one of said inlet and outlet sections having a sidewall extending axially between first and second end walls and of larger diameter than said aftertreatment element and providing a plenum of reduced restriction.

9. An aftertreatment exhaust assembly comprising an axially extending housing containing an aftertreatment element, said aftertreatment element being selected from the group consisting of at least one of a particulate soot filter and a catalyst element, said housing having an inlet and an outlet communicating respectively with axially distally opposite axial ends of said aftertreatment element, wherein exhaust flows from said inlet then axially through said aftertreatment element then to said outlet, said housing comprising at least first and second sections, one of said sections being selected from the group consisting of an inlet housing section and an outlet housing section, said one section having a sidewall extending axially; wherein said first housing section is an outlet housing section, said aftertreatment element extends axially into said outlet housing section along a first axial direction, said aftertreatment element has an outlet axial end within said outlet housing section, said outlet housing section has a sidewall extending axially between first and second end walls and of larger diameter than said aftertreatment element and providing an outlet plenum of reduced restriction; wherein said first end wall of said outlet housing section is axially spaced from said outlet axial end of said aftertreatment element along said first axial direction; said second end wall of said outlet housing section is axially spaced from said outlet axial end of said aftertreatment element along a second axial direction, said second axial direction being opposite to said first axial direction; said sidewall of said outlet housing section has a first span extending from said first end wall axially along said second axial direction to a midpoint radially aligned with said outlet axial end of said aftertreatment element, and has a second span extending from said midpoint axially along said second axial direction to said second end wall, said first span and said first end wall defining an open volume first plenum section at said outlet axial end of said aftertreatment element and extending axially along said first axial direction therefrom, said second span and said second end wall defining an annular volume second plenum section at said outlet axial end of said aftertreatment element and extending axially along said second axial direction therefrom and in circumscribing relation to said aftertreatment element.

10. The exhaust assembly according to claim 9 wherein the axial length of said second span is greater than the axial length of said first span to reduce and save space at said outlet axial end of said aftertreatment element along said first axial direction therefrom and reduce the amount of axial extension of said housing in said first axial direction beyond said outlet axial end of said aftertreatment element.

11. The aftertreatment exhaust assembly according to claim 9 wherein said sidewall is of larger diameter than said second housing section.

12. The aftertreatment exhaust assembly according to claim 9 wherein said outlet extends radially from said outlet housing section and is radially aligned with said outlet axial end of said aftertreatment element.

13. A method for saving space in an aftertreatment exhaust assembly having an axially extending housing containing an aftertreatment element, said aftertreatment element being selected from the group consisting of at least one of a particulate soot filter and a catalyst element, said housing having an inlet and an outlet communicating respectively with axially distally opposite axial ends of said aftertreatment element, wherein exhaust flows from said inlet then axially through said aftertreatment element then to said outlet, said housing having at least first and second sections meeting at a joint, said space saving method comprising providing inlet and outlet housing sections wherein said aftertreatment element extends axially into one of said inlet and outlet housing sections, with an axial end of said aftertreatment element being within said one housing section, providing said one housing section with a sidewall extending axially between first and second end walls and of larger diameter than said aftertreatment element and providing a plenum of reduced restriction and reduced axial extension from said axial end of said aftertreatment element; providing said first housing section as an outlet housing section wherein said aftertreatment element extends axially into said outlet housing section, with an outlet axial end of said aftertreatment element being within said outlet housing section, providing said outlet housing section with a sidewall extending axially between first and second end walls and of larger diameter than said aftertreatment element and providing an outlet plenum of reduced restriction and reduced axial extension along said axial direction from said outlet axial end of said aftertreatment element; providing said first end wall of said outlet housing section axially from said outlet axial end of said aftertreatment element along a first axial direction, spacing said second end wall of said outlet housing section axially from said outlet axial end of said aftertreatment element along a second axial direction, said second axial direction being opposite to said first axial direction, providing said sidewall of said outlet housing section with a first span extending from said first end wall axially along said second axial direction to a midpoint radially aligned with said outlet axial end of said aftertreatment element, and providing said sidewall of said outlet housing section with a second span extending from said midpoint axially along said second axial direction to said second end wall, providing said first span and said first end wall defining an open volume first plenum section at said outlet axial end of said aftertreatment element and extending axially along said first axial direction therefrom, providing said second span and said second end wall defining an annular volume second plenum section at said outlet axial end of said aftertreatment element and extending axially along said second axial direction therefrom and in circumscribing relation to said aftertreatment element.

14. The method according to claim 13 comprising providing said joint at a location axially between said axial ends of said aftertreatment element.

15. The method according to claim 13 comprising providing said second span of greater axial length than said first span to reduce and save space at said outlet axial end of said aftertreatment element along said first axial direction therefrom and reduce the amount of axial extension of said housing in said first axial direction beyond said outlet axial end of said aftertreatment element.

* * * * *

UNITED STATES PATENT AND TRADEMARK OFFICE
CERTIFICATE OF CORRECTION

| | |
|---|---|
| PATENT NO. | : 7,582,267 B1 |
| APPLICATION NO. | : 11/243694 |
| DATED | : September 1, 2009 |
| INVENTOR(S) | : Klein et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Fourteenth Day of September, 2010

David J. Kappos
*Director of the United States Patent and Trademark Office*